Figure 1:
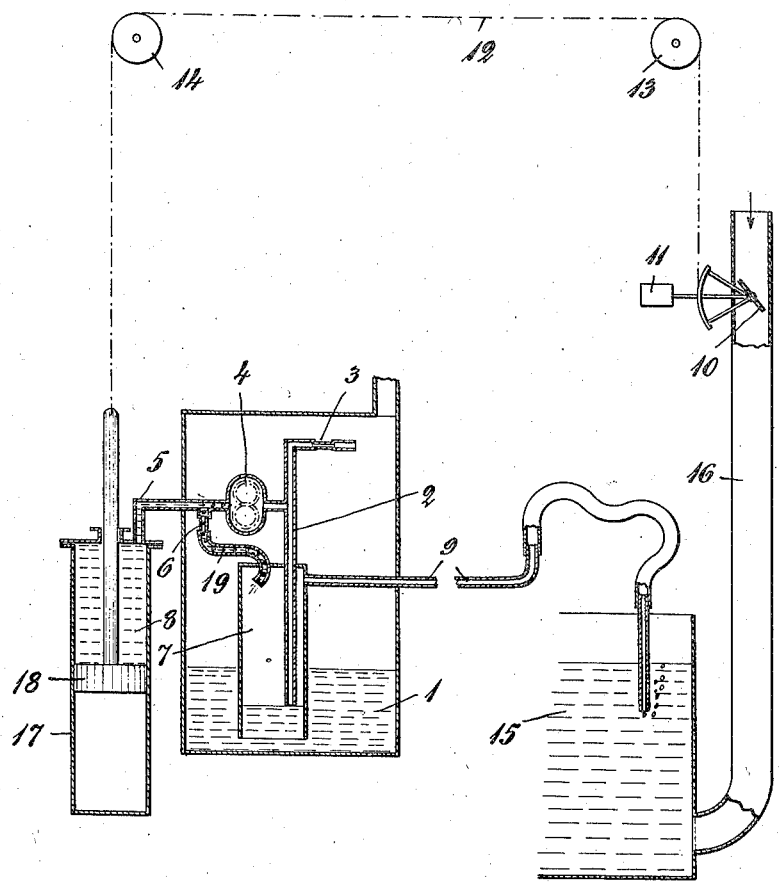

Feb. 21, 1939. K. T. KÄLLE 2,147,977
REGULATING MEANS WITH SERVOMOTOR
Filed Oct. 15, 1937 2 Sheets-Sheet 1

K. T. Källe
INVENTOR

By Glascock Downing & Seebold

Patented Feb. 21, 1939

2,147,977

UNITED STATES PATENT OFFICE 2,147,977

REGULATING MEANS WITH SERVOMOTOR

Karl Torsten Källe, Saffle, Sweden

Application October 15, 1937, Serial No. 169,333
In Sweden October 29, 1936

5 Claims. (Cl. 137—68)

The present invention refers to improvements in regulating means with servo-motor of the known type where liquid is supplied to the servo-motor by means of a suction and pressure pump, and where the subject to be regulated is controlled by a device for the introduction of a gaseous medium into the liquid on the suction side of the pump, the quantity of which medium determines the quantity of liquid which at an equal speed of the pump passes through the latter, and which upon the removal of the gaseous medium on the pressure side of the pump is supplied by the latter to the servo-motor so as to exert a greater or smaller pressure on the movable members thereof, the movements of which are transmitted to the regulating member.

The regulating device of the known type constructed by the applicant answers high demands, but in certain cases it may be found desirable to be able to increase the sensitivity thereof, and the present invention relates to a modified construction having for its purpose to render this possible, a simplified and safe operation being obtained at the same time.

The increased sensitivity is obtained with smaller impulse forces, which depends on the fact that a considerably smaller air or gas quantity is impeded by the impulse member relatively to that quantity of oil which per unit of time is supplied to the servo-motor performing the regulating work. In the known arrangement, the air quantity supplied to the oil is always inversely proportional to the quantity of oil conveyed to the servo-motor and performing the regulating work, which is responsible for the fact that comparatively great adjusting forces are required to adjust the impeding device of the impulse member.

The present invention is substantially distinguished by the feature that the suction pipe of the pump opens into a vessel which with its lower open end is submerged into the liquid in a larger liquid container, and that the suction pipe outside this vessel is provided with an air supply member of a smaller passage area than that of the suction pipe, so that a certain quantity of air determined by the said area is always introduced during the work of the pump, in addition to which a restricted outlet provided in the pressure conduit of the pump communicates with the said vessel which, in turn, is provided with an outlet for the air separated from the oil and introduced into the vessel, the exit of which gas is impeded directly or indirectly by the subject to be regulated so that different pressures will be produced in the said vessel, such pressures causing different transmissions of motion from the servo-motor.

Figure 2:
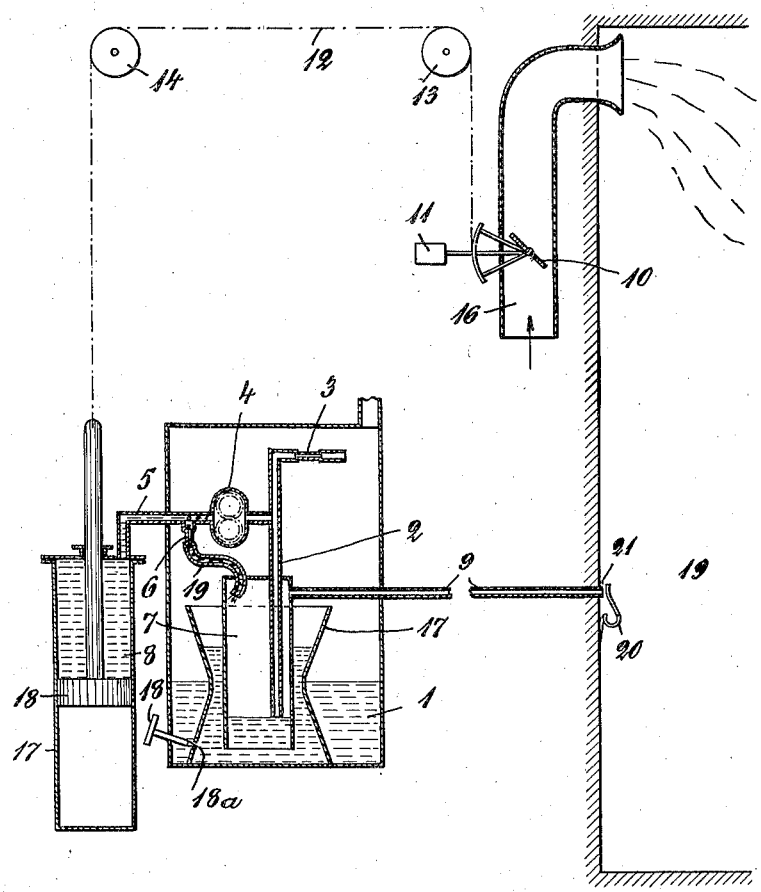

Some embodiments of the invention are illustrated by way of example in the accompanying drawings wherein Fig. 1 shows an embodiment in which the subject to be regulated is assumed to consist of a liquid, the surface of which is to be kept on a constant level. Fig. 2 shows a second embodiment wherein the subject to be regulated is taken to be the temperature of a room, the temperature of which is to be kept constant by means of heated air supplied thereto.

In Fig. 1 1 designates an oil container, 2 a conduit connected with the suction side of the pump 4, said conduit extending into a vessel 7, the lower open end of which merges into the oil in the container 1. Connected to the conduit 2 is an air-intake which, according to the drawings, consists of a pipe provided with a restriction 3, the passage area of which is constant and smaller than the sectional area of the pipe 2. The suction and pressure pump 4 is, according to the drawings, taken to be a gear wheel pump. The pressure side of the pump is connected through the conduit 5 with the servo-motor 8 which, according to the drawings, consists of a cylinder 17 with a piston 18 movable therein.

Extending from the vessel 7 is a pipe conduit 9 opening into the liquid in the receptacle 15 the level of which is to be kept constant. The liquid is supplied to the receptacle 15 through the pipe conduit 16, in which is provided a control valve 10 with a counterweight 11. The control valve and its counter-weight are connected with the piston of the servo-motor by means of a wire or the like 12 running over the guide rollers 13, 14. Provided in the pressure conduit 5 of the servo-motor is a restricted outlet 6 communicating through a pipe conduit 19 with the interior of the vessel 7.

The arrangement above described operates in the following manner:

During the whole regulating cycle the oil level in the container 1 is taken to be practically constant, which may be easily obtained by making the area of this container sufficiently large relatively to the volume of the servo-motor 8. Before the oil pump is started, the oil level in the two vessels 1 and 7 is the same, inasmuch as these vessels communicate with each other. The suction conduit 2 then extends comparatively far down below the level in the vessel 7, which in the following will be termed the degassing vessel.

If the gear wheel pump 4 is now started, a pressure below atmospheric will be produced in the pipe 2, so that oil will be sucked up through this pipe, at the same time as a certain quantity of air is being sucked in through the nozzle 3, which quantity is determined by the passage area of this nozzle. This passage area is selected so that the volume of air sucked in will be substantially smaller than the volume of the sucked-in oil. Preferably, the sectional area of the nozzle 3 is chosen in such a manner relatively to the sectional area of the conduit 2 that the ratio of the sucked-in quantity of air to the sucked-in quantity of oil will be about equal to 1:10. Thus, a comparatively immaterial quantity of air will be sucked in through the nozzle 3 relatively to the sucked-in quantity of oil.

The mixture of air and oil sucked in through the work of the pump is transferred from the pressure side of the pump 4 through the conduit 5, the air and a portion of the oil then escaping through the outlet 6, and is through conduit 19 conveying back to the degassing vessel 7. The said outlet is so dimensioned that a certain pressure above atmospheric is maintained in the servo-motor 8 during the work of the pump, the piston 18 of the servo-motor being thus pressed downwardly, so that the counterweight 11 is raised and the control valve 10 is opened in consequence thereto. Thus more liquid will be supplied to the receptacle 15 so as to cause the level in the latter to rise. However, as the air separated from the oil in the degassing vessel 7 escapes through the pipe 9 merging with its lower end beneath the level of the liquid in the receptacle 15, such air has to overcome an ever increasing resistance on account of the fact that the level in the receptacle 15 is rising. Consequently, the pressure in the degassing vessel 7 must increase according as the level is rising in the receptacle 15. The increased pressure in the vessel 7 causes the oil level therein to sink, and at a certain rise of the level in the receptacle 15 the suction conduit 2 will be freed from the oil level in the vessel 7. At this moment, the gear wheel pump ceases to suck oil and continues to suck air only, such air being thus caused to circulate through the outlet 6 and the vessel 7. The pressure in the conduit 5 and the servo-motor 8 will then sink, so that the counter-weight 11 becomes predominant and pulls the piston of the servo-motor upwardly. The oil in the servo-motor is then forced back together with the air into the degassing vessel 7 through the outlet 6 and conduit 19. The control valve 10 now commences to throttle the liquid supply, so that the level in the receptacle 15 is caused to sink, the pressure in the degassing vessel 7 being then also reduced in a corresponding degree. The oil level will then rise therein, so that the suction pipe 2 is again caused to merge with its free end into the oil which is sucked up by the pump. The pressure then again rises in the servo-motor 8, the piston of which is thus caused to move downwardly to effect the opening of the control valve 10 so as to increase the supply of liquid to the receptacle 15, and so forth.

In the embodiment shown in Fig. 2 it is assumed that the temperature of a room 19 is to be regulated so as to be kept constant, heated air being then forced into the same through the conduit 16. In order here to obtain the highest possible degree of sensitivity for a certain change of the position of the piston in the servo-motor 8, while facilitating a stable control (without oscillations), there is provided for this purpose a special arrangement with so-called resilient return. This arrangement comprises a vessel 17 arranged outside the vessel 7 and extending down to the bottom of the container 1, by reason of which said vessel 17 screens off the direct communication between the oil container 1 and the degassing vessel 7, while facilitating a communication between these through a restricted opening 18a which may be controlled by means of a regulating device taking the form of a screw 18, according to the drawings. In this case it will be necessary to use this arrangement with resilient return, inasmuch as a certain time passes by before the temperature of the air flowing into the room 19 comes to influence the impulse member employed for the control, which member will be described below.

The remaining parts save for those relating to this resilient return are the same and designated in the same way as in Fig. 1. Here, a strip 20 of bimetal is indicated as the impulse member by way of example, said strip being thus sensitive to variations in temperature. If the temperature in the room 19 rises over the normal value, the bimetal strip 20 will bend in a direction toward the exit nozzle 21 of the indicating pipe 9, its impeding effect on the air escaping through the said pipe being thus increased. The pressure will then be increased in the degassing vessel 7, so that the oil level therein is caused to sink. At a certain position of the impulse member 20, corresponding to a certain desired temperature in the room 19, the flow of air through the conduit 9 will be restrained so much that the level of the liquid is caused to sink below the mouth of the suction pipe 2, the effect being then the same as above described with reference to Fig. 1. The counterweight 11 of the control valve 10 will thus be lowered, the valve 10 being then caused to throttle the air supply in a corresponding degree.

In the position of equilibrium, the level in the vessel 17 is the same as that in the container 1. According to the embodiment shown, the vessel 17 has been given the form of a double cone, the smallest sectional area of which is on the same level as the surface of the liquid in the container 1. This has for its object to bring about the greatest possible alteration of the level in the vessel 17 at an immaterial alteration of the position of the piston in the servo-motor. The volume of the vessel 17 is preferably so chosen that it is substantially equal to the volume of the servo-motor 8.

Assuming now that the temperature in the room 19 rapidly falls by a few degrees, for instance at the opening of a door, then by reason of this lowering of the temperature the impulse member 20 withdraws from the nozzle 21, bringing about a reduced restrainment of the flowing forth of the air and thus a reduction of the pressure in the conduit 9 and the vessel 7. The level then rises in the vessel 7, more oil being pumped up by the pump, entailing an increase of the pressure in the servo-motor 8 and a depression of the piston therein by a certain distance. By reason of the fact that oil is pumped off to the servo-motor, the level of the liquid is thus caused to sink in the vessel 17, which causes the level in the vessel 7 also to sink, the suction pipe then again ridding itself of the oil and the piston of the servo-motor being again brought to a standstill. If the temperature in the room 19 had fallen by a few more degrees than assumed above, the impulse member 20 would also have withdrawn still more from the nozzle 21, whereby the pressure in the vessel 7 would have been lowered furthermore, corresponding to a still greater lowering of the level in the vessel 17 and to a further depression of the piston in the servo-motor, before the surface of the liquid in the vessel 7 would free itself from the suction pipe so as to establish equilibrium.

This having occurred, oil will flow from the container 1 through the opening 18a into the vessel 17 so that the level therein is caused to rise gradually. The passage area of the opening 18a is adapted by means of the screw 18, so that the said rise will be such as to bring about a corresponding alteration of the position of the impulse member 20 through the new position of the piston and the control valve 10 respectively and by an increased supply of heat to the room 19 in consequence thereto, so that the pressure in the pipe 9 and the vessel 7 increases according as the level rises in the vessel 17.

Again, if the temperature in the room 19 is increased above the desired temperature, the same cycle as above described will be performed, but in the reversed order. The level of the liquid will then rise in the vessel 17 above the level in the container 1, and this is the position which is shown in Fig. 2.

The longer the time elapsing from the moment the control valve 10, for instance, commences to open for the heated air and until an alteration of the temperature has taken place in the room 19 and such alteration of the temperature has had time to influence the impulse member 20, the more pronounced must the throttling of the opening 18a be made to ensure a regulation free from oscillations.

Obviously, the invention is not limited to the embodiments set forth, which may be varied with respect to the details within the scope of the invention.

Thus the means indicated above may be replaced by other means with an equivalent effect. In place of oil, it will thus be possible to employ any other suitable liquid, and instead of air, some other suitable gas may be used, and so forth. Nor is the invention limited to any certain type of impulse member, in that other impulse members, such as bellows, diaphragms and the like may be brought into use.

I claim:

1. Regulating means, comprising in combination a suction and pressure pump, a servomotor, the pressure conduit of the pump opening into the servo-motor, while the suction conduit of the same merges down into liquid in a vessel open at its lower end and communicating with the liquid in a larger container, a supply member for gas on said suction conduit, the passage area of which is constant and smaller than that of the suction conduit, a restricted outlet on said pressure conduit communicating with said vessel, a conduit extending from said vessel to the subject to be regulated and through which the gas coming from the pressure conduit of the pump and introduced into the vessel escapes, different pressures being produced in the said vessel dependent on the resistance to the escape of the gas through the said escape conduit, said different pressures bringing about variations in the level of the liquid in the said vessel, so that either gas and liquid or gas alone is supplied to the pump, and means for transmitting the movements of the movable parts of the servo-motor to a regulating or indicating member for the subject to be controlled.

2. Regulating means, comprising in combination a suction and pressure pump, a servo-motor, a liquid container, a vessel open at its lower end and placed in said container so as to communicate with the liquid in the same, the suction conduit of the pump merging into the liquid in said vessel, a supply member for gas on said suction conduit, the passage area of which is constant and smaller than that of the suction conduit, the pressure conduit of the pump opening into the servo-motor, a restricted outlet on said pressure conduit communicating with the said vessel, a conduit extending from said vessel to the subject to be regulated and through which the gas coming from the pressure conduit of the pump and introduced into the vessel escapes, different pressures being produced in the said vessel dependent on the resistance to the escape of the gas through said escape conduit, said different pressures bringing about variations in the level of the liquid in said vessel, so that either gas and liquid or gas alone is supplied to the pump, causing different positions of the responsive member of the servo-motor, and means for transmitting motion from said responsive member of the servo-motor to a regulating member for the subject to be controlled.

3. Means for regulating a condition, comprising in combination a gear-wheel pump, a servo-motor, a liquid container, a vessel open at its lower end and introduced into said container so as to communicate with the liquid in the latter, the suction conduit of the pump merging into the liquid in the said vessel, a supply member for gas on said suction conduit located outside the vessel and the passage area of which is smaller than that of the suction conduit, the pressure conduit of the pump opening into a chamber of the servo-motor limited by a piston movable in the same, a restricted outlet on said pressure conduit, and a conduit connecting said restricted outlet with the interior of said vessel, a conduit extending from said vessel the gas coming from the pressure conduit of the pump and into the vessel escaping through said conduit, means whereby changes in the condition cause different resistances to the escape of the gas through said escape conduit and thereby creating different pressures in the vessel, so that either gas and liquid or gas alone is supplied to the pump, causing different positions of the piston in the servo-motor, and means for transmitting the movements of the piston to a control means for restoring said condition, whereby said condition is maintained substantially constant.

4. Regulating means, comprising in combination a suction and pressure pump, a servo-motor, a liquid container, a degassing vessel open at its lower end and introduced into said container so as to communicate with the liquid in the latter, a larger vessel arranged outside the degassing vessel and screening off the communication between the container and the degassing vessel, a restricted opening on said outer vessel establishing a communication between the same and the container, means for regulating the area of said opening, the suction conduit of the pump merging into the liquid in said degassing vessel, a supply member for gas on said suction conduit located outside the degassing vessel and the passage area of which is smaller than that of the suction conduit, the pressure conduit of the pump opening into the servo-motor, a restricted outlet on said pressure conduit and a conduit connecting said restricted outlet with the interior of the degassing vessel, a conduit extending from said vessel, an impulse member at the outlet opening of said conduit and acted upon by the subject to be regulated, the gas coming from the pressure conduit of the pump escaping through said escape conduit and acting on the said impulse member, different resistances to the escape of the gas through said conduit being caused by said impulse member, said different resistances creating different pressures in the degassing vessel, so that either gas and liquid or gas alone is supplied to the pump, thereby causing different positions of the responsive member of the servo-motor, and means for transmitting the movements from said member of the servo-motor to regulating means for regulating the conditions of the subject to be regulated acting on said impulse member.

5. Regulating means according to claim 4, characterized by the fact that the outer vessel surrounding the degassing vessel has the form of a double cone, the smallest sectional area of which is situated substantially at the same level as the surface of the liquid in the container.

KARL TORSTEN KÄLLE.